Aug. 4, 1925.

G. W. GOODRIDGE ET AL 1,548,677

MANUFACTURE OF BEAD CHAINS

Original Filed March 2, 1921   3 Sheets-Sheet 1

INVENTOR
GILBERT W. GOODRIDGE
WILLIAM J. GAGNON
BERNARD E. GAGNON

BY *Strong and Strong* ATTORNEYS

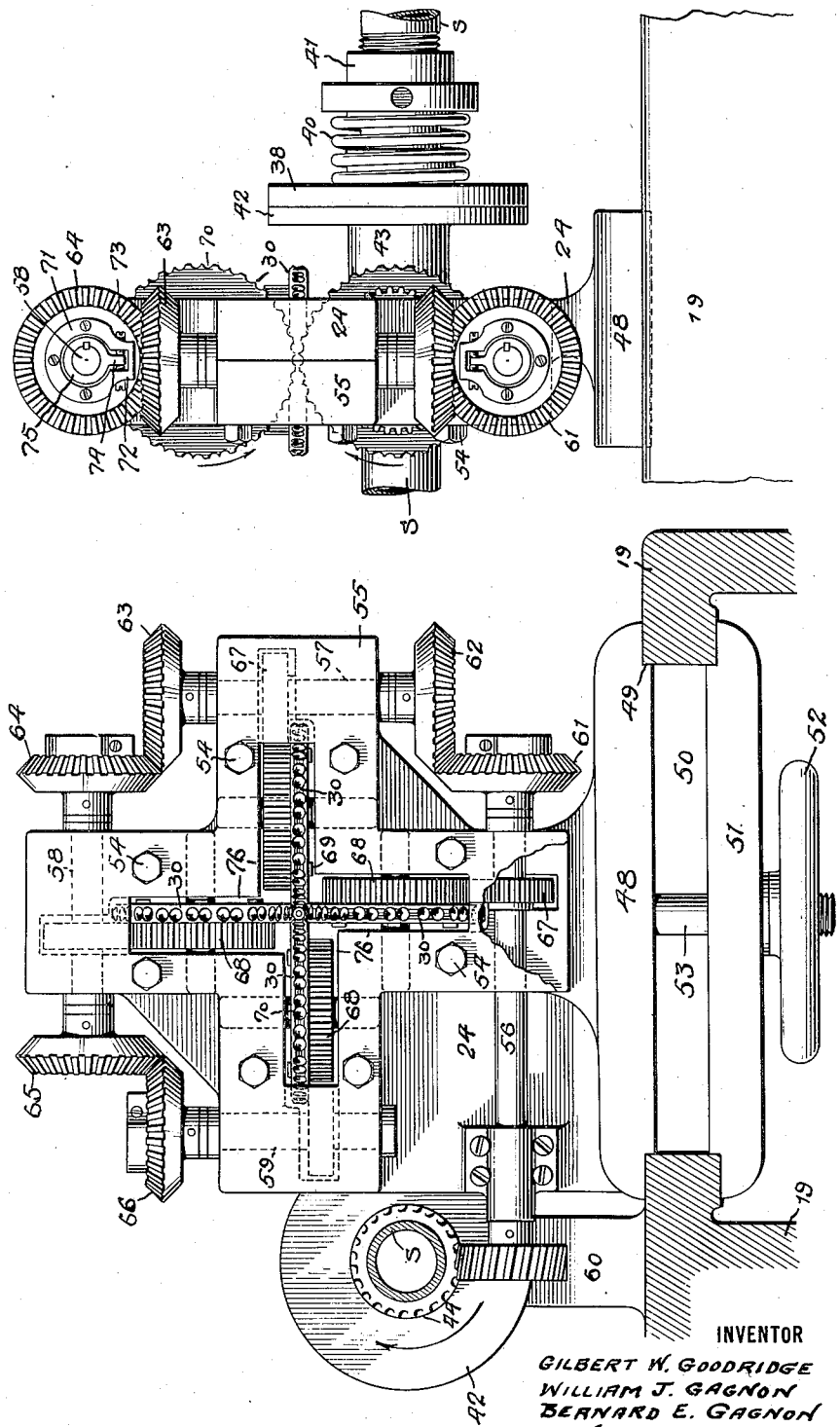

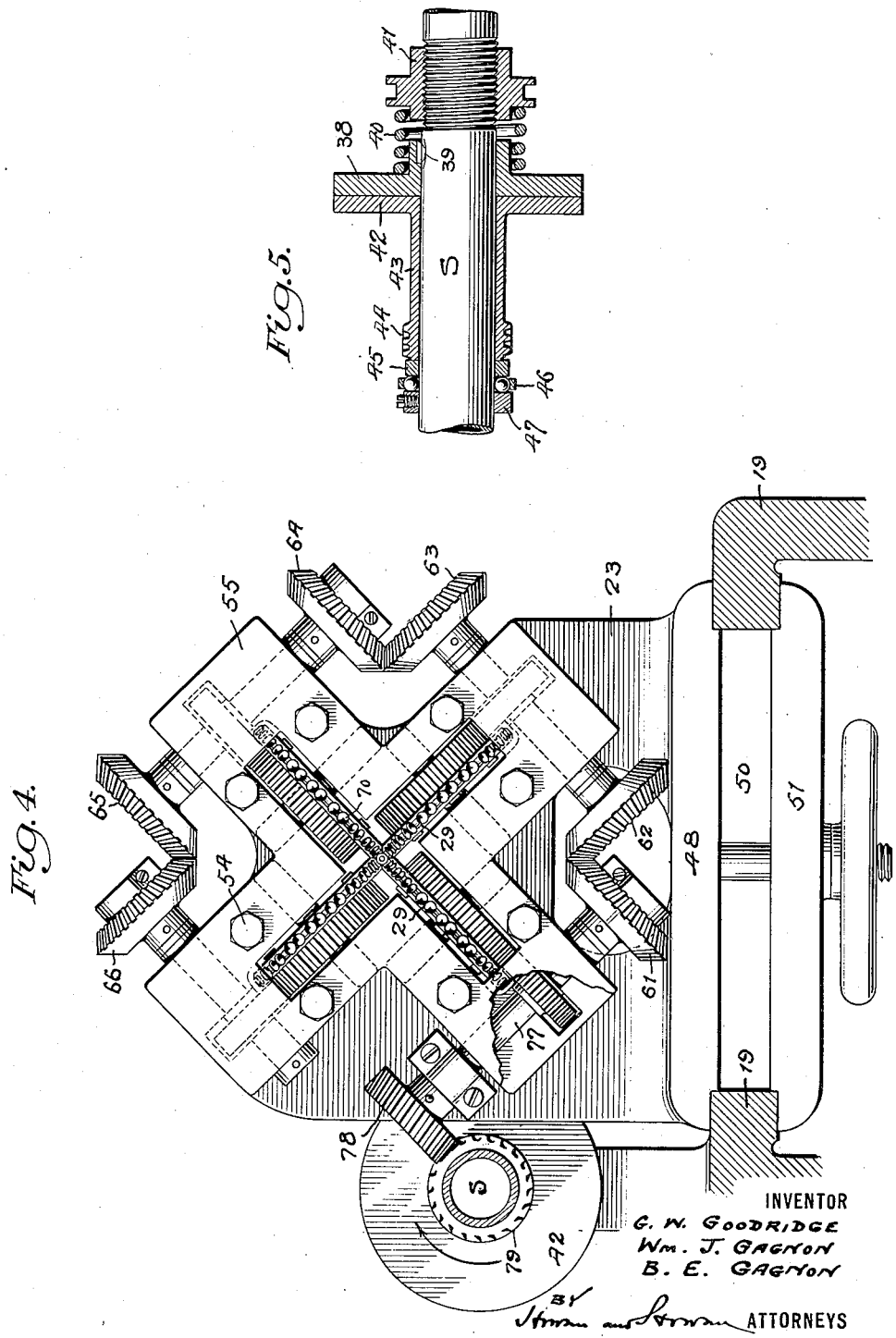

Patented Aug. 4, 1925.

1,548,677

UNITED STATES PATENT OFFICE.

GILBERT W. GOODRIDGE, WILLIAM J. GAGNON, AND BERNARD E. GAGNON, OF BRIDGEPORT, CONNECTICUT, ASSIGNORS TO THE BEAD CHAIN MANUFACTURING COMPANY, OF BRIDGEPORT, CONNECTICUT, A CORPORATION OF CONNECTICUT.

MANUFACTURE OF BEAD CHAINS.

Application filed March 2, 1921, Serial No. 449,149. Renewed January 3, 1925.

*To all whom it may concern:*

Be it known that we, GILBERT W. GOODRIDGE, WILLIAM J. GAGNON, and BERNARD E. GAGNON, all citizens of the United States of America, and residing in the city of Bridgeport, county of Fairfield, and State of Connecticut, have invented certain new and useful Improvements in the Manufacture of Bead Chains, of which the following is a specification.

Our invention relates to the manufacture of bead chains of the type shown in the Gagnon Patent No. 1,078,494, dated November 11, 1913. In particular the present invention relates to an improved method and apparatus for manufacturing bead chains of the type mentioned, and by which the feeding and forming operations on the chain are continuous, the speed of operation accelerated, and the output increased, while the apparatus works with relatively little noise and vibration. In these respects the invention constitutes a marked improvement over the invention described and claimed in Patent No. 1,087,876 of February 17, 1914, the differences being hereinafter pointed out more specifically or illustrated in the accompanying drawings, in which—

Fig. 1 is a more or less diagrammatic side elevation of an apparatus in which our invention is embodied in one form;

Fig. 2 is a section on the line 2—2, Fig. 1;

Fig. 3 is a side elevation of a unit shown in Fig. 2;

Fig. 4 is a section on the line 4—4, Fig. 1;

Fig. 5 is a longitudinal section through a driving connection for one of the units;

Figs. 6 and 7 are more or less diagrammatic sections illustrating the operation of successive die units upon the shank of the dumb-bell core of the chain;

Figs. 8 and 9 are similar views illustrating the operation of successive dies upon a similar portion of the ball element of the chain; and Fig. 10 is a side elevation, partially in section, illustrating the product at different stages of formation.

The general arrangement of the present apparatus is illustrated in Fig. 1, in which are shown the two groups, A and B, of rotary die elements, to which are fed, from reels 15 and 16, two flat ribbons or strips 17 and 18 of metal (brass, for example) from which the chain is formed. The dies of group A shape the ribbon 17 into a core 25 of dumb-bell links for the chain, while the dies of group B shape the ribbon 18 into a surrounding casing of balls each of which embraces the heads of a pair of adjacent dumb-bell link elements. After the elements of the link core and ball casing respectively have been parted, they remain flexibly united and form the type of chain disclosed in the Gagnon patent above noted.

Inasmuch as several successive operations are required to form the respective ribbons into the dumb-bell and ball elements of the chain, each group A and B comprises a plurality of die units, three being indicated by way of example in group A and two in group B, it being understood of course, that the number of units in each group may be as great or as small as requisite for the work in hand, and may be varied with the diameter of the chain or the gauge of the metal ribbon used, or with the perfection of finish desired in the product. Furthermore, while spherical balls are illustrated in the drawings, it will be recognized that the dies of group B may be cut to impart any desired contour to the ball element of the chain, or even to the link, if it is desired to vary the latter.

Referring more in detail to the construction shown in Fig. 1, the bed 19 of the machine carries at suitably spaced points open bearings 20 and 21 for readily replaceable reels 15 and 16 which feed the metal ribbons 17 and 18 to the forming dies. Between the reels are adjustably supported the standards 22, 23 and 24 which carry the rotary die wheels for forming the dumb-bell core 25 of the chain. The standard 22 adjacent the reel 15 carries a bracket 26 with tube die 27 for shaping the ribbon 17 into a tube, which passes directly to the bite of the first group of rotary forming dies 28. The partially formed tube now passes (through a guide X if necessary, shaped to prevent twisting of the tube) to a second set of rotary forming dies 29 carried by standard 23 and lying in planes at an angle, to those of the prior set 28 (see Figs. 6 and 7). The fins formed by the passage of the tube between the dies 28 are smoothed out by the dies of the group 29, which further shape the dumb-bells. The dumb-bell core then passes through a third set of rotary dies 30, where the shaping is completed to the condition shown at the left-hand end of Fig. 10.

The thus formed core of united dumb-bells now passes to the dies of group B mounted on standards 31, 32, etc. Standard 31 carries bracket 33 having a stationary tube drawing die 34 for longitudinally curling the ribbon 18 into a tube. The dumb-bell core 25 enters the die 34 above the ribbon 18, and the latter is drawn upward around it into a tube, both passing together to the bite of the rotary forming dies 35 for forming the tubular casing into spaced balls. The second unit of ball dies 36 is arranged at an angle to the first group to remove any fins, and to further form the balls. It is succeeded by a third, or more die groups to bring the ball casing element 37 of the chain to the condition indicated at the left hand end of Fig. 10.

The dumb-bell core and encasing ball element of the chain having been thus shaped, but the members of each element still adhering, they are now led through a zigzag course (not indicated) to part adjacent balls and adjacent links (as in the above mentioned patent), thus completing the chain forming operation. The product in its thus complete condition (indicated at the right hand end of Fig. 10) may be spooled, or otherwise gathered ready for polishing, lacquering, coloring, etc.

The details of construction of the rotary die units may be variously modified, as well as the drive connections therefor. We have indicated however a common drive shaft S extending longitudinally of the bed 19. The drive connections from this shaft to the several die units are preferably of friction type. In Fig. 5 we have shown a friction disc 38 sliding on the spline 39 on the shaft. A thrust spring 40, the tension of which is adjusted by the abutment ring 41 screwing on the shaft S, presses the disc 38 against the cooperating disc 42 at one end of the sleeve 43, on which is formed the spiral gear 44. A washer 45 and roller bearing 46 are preferably interposed between the end of the sleeve 43 and the thrust ring 47. Inasmuch as the slip between the discs 38 and 42 may result in the generation of considerable heat, the drive shaft is preferably made tubular, as shown, to permit of water cooling.

A friction drive of this character is particularly desirable, since it permits a very nice adjustment of the speed of the several units by varying the pressure of the thrust spring 40 and thus varying the amount of slip between the discs. This speed differential is provided to take up any slack which may be formed in the tubular blank between successive die units as an incident to the drawing action of the dies. Thus, we have found that if the dies of units 22 and 23 are run at the same peripheral speed, a gradually increasing slack occurs in the reach between the units. The peripheral speed of the die groups must therefore be varied to meet this condition, and an adjustable friction drive from the shaft S affords ready and sensitive means to this end. A variation in diameter of the die wheels would of course attain the same result, but with serious practical difficulties, which will be readily recognized by those skilled in the art.

The detail construction of one of the dumb-bell die units is illustrated in Figs. 2 and 3. The standard 24 has a foot piece 48 shouldered at 49 to fit the slideway 50 formed in the bed 19. A co-operating clamping plate 51, which engages the lower margins of the slideway and secures the standard in longitudinally adjusted position on the bed, is held by the hand-nut 52 working on the screw 53, which passes downward from the standard through the clamping plate. Mounted on the standard by bolts 54 is a cross-arm casting 55 in the nature of a bearing cap for the several transmission shafts 56, 57, 58 and 59, lying at right angles to each other in the same plane, and journaled in bearings formed in juxtaposed faces of the standard and cap. The shaft 56 takes its drive through gear wheel 60 meshing with the gear 44 on sleeve 43 (Fig. 5) and transmits the drive through bevel gears 61 and 62 to shaft 57; thence through bevel gears 63 and 64 to shaft 58, and finally through bevel gears 65 and 66 to shaft 59. Each of the several shafts 56 to 59 carries a pinion 67 meshing with a gear wheel 68, the several pinions and gears being of uniform diameter and gear ratio to insure their synchronous rotation at uniform peripheral speed. Driven by the several gears 68 are die wheels 30 of uniform diameter, preferably mounted directly on the gears 68 by means of screw bolts 69. The die wheels are so arranged that their planes of rotation intersect at a common point, to which their peripheries approach as closely as necessary for the desired forming operation upon the tubular blank. Die outlines 70 are diagrammatically illustrated on the peripheries of the wheels 30, it being understood of course that those shown are merely indicative of the utility of the die wheels.

While the die wheels may be adjustably connected to the gears 68 by the screws 69 in order to secure exact registry of the peripheral die outlines of the several wheels at their working point of juxtaposition, this method of adjustment is awkward, and we prefer the arrangement shown in Fig. 3. As will be noted, the connection between the bevel gear 64 and the shaft 58 is established through a collar 71 bolted to the gear wheel and provided with a bay 72 through the opposite sides of which extend set screws 73. Between the latter and engaged thereby, is a lug 74 projecting from the sleeve 75 keyed to the shaft 58. By adjusting the set screws the relative angular position of the shaft 58 and gear 64 may be varied. Since the gear 67 on the shaft 56 controls the position of the die wheel 30 it is obvious that precise registry of the die outlines on the peripheries of the several die wheels 30 may be thus accurately secured, since each of the shafts 56 to 59 is provided with a like adjusting device.

Where the gears or die wheels are of a diameter sufficient to require it, the standards and cap plates are slotted as at 76 to permit these parts to project beyond the outer faces of the standard and cap.

While we have illustrated die units each comprising a group of four die wheels, it will of course be understood that the number of these to a unit is optional, two or three sufficing in some instances, while more than four may be provided if necessary.

As above mentioned, certain of the rotary forming die units are arranged with their die wheels lying in planes at an angle to the planes of the die wheels of other units. This is illustrated in Fig. 1, where the die wheels of the units on standards 23 and 32 lie in planes at an angle to those of the die wheels of units on standards 22, 24 and 31. The unit of standard 23 is illustrated on an enlarged scale in Fig. 4. In its main features it is identical with that of Figs. 2 and 3, save for the inclination of the several die wheels and their transmission shafts, and the modification of this standard 23 to accommodate the different position of these parts. The shaft 77, however, is shortened, and the angle of the spirals of gears 78 and 44 reversed in direction (inasmuch as the drive is now taken from above instead of from below the main driving shaft S) in order to secure the same direction of rotation for the die wheels in all of the units.

In Figs. 6 and 7 we have shown on a larger scale two successive die operations upon the tubular dumb-bell blank, the section being taken through the shank of a dumb-bell. The peripheries of the die wheels are beveled to permit their working faces to be brought into close juxtaposition. The first operation (Fig. 6) corresponds to that effected by the dies on the standard 22; the second operation (Fig. 7) corresponds to that effected by the die wheels on standard 23; while the third operation, by the dies on the standard 24, completes the formation of the shank. The final contour of the dumb-bell shank is shown in Figs. 8 and 9, which indicate two successive operations upon the tubular ball blank at a point intermediate successive balls.

Among the advantages derived from the present construction may be mentioned its high speed production capacity, its relatively noiseless operation, the elimination of feed mechanism (inasmuch as the rotary dies themselves draw the ribbons from the reels), the elimination of the necessity for rotating the tubular blank between successive die units to remove fins, the absence of all reciprocating parts with their incidental waste of power during their non-working movements, economy of operation, ease of adjustment and regulation, and uniformity of product.

We wish it to be clearly understood that modifications of various sorts may be made in construction and arrangement of parts, without departing from what we claim as our invention.

We claim—

1. A machine for making bead chains, comprising a group of rotary dies for forming a tube into a series of connected dumb-bells, in combination with means for forming a tube around said dumb-bell shapes, and a group of rotary dies for forming said outer tube into a series of connected hollow balls surrounding the heads of adjacent dumb-bells.

2. A machine for making bead chains, comprising a group of rotary dies for forming a tube into a series of connected dumb-bells, in combination with means for forming a tube around said dumb-bell shapes, and a group of rotary dies for forming said outer tube into a series of connected hollow balls surrounding the heads of adjacent dumb-bells together with a common drive for the several rotary die groups.

3. A machine for making bead chains, comprising a group of rotary dies for forming a tube into a series of connected dumb-bells, in combination with means for forming a tube around said dumb-bell shapes, and a group of rotary dies for forming said outer tube into a series of connected hollow balls engaging the dumb-bell heads, together with means for driving the dies of different units of a group at different peripheral speeds.

4. In a machine for making bead chains, means for forming a metal ribbon into a tube, and a series of rotary die units successively operating on said tube to form the same into a series of connected dumb-bells.

5. In a machine for making bead chains, means for forming a metal ribbon into a tube, and a series of rotary die units successively operating on said tube to form the same into a series of connected dumb-bells, certain of said die units having dies rotating in planes at an angle to the planes of the rotary dies of certain other of said units.

6. In a machine for making bead chains, means for forming a metal ribbon into a tube, and a series of rotary die units successively operating on said tube to form the same into a series of connected dumb-bells, a common drive shaft for the several units, and adjustable friction drive connections from said shaft to the several units, said drive connections being independent of each other and adjustable to permit different peripheral speeds to be imparted to the rotary dies of different units.

7. In a machine for making bead chains, a die unit comprising a series of rotary die wheels arranged at an angle to each other, with their planes of rotation intersecting at a common point, said die wheels having peripheral shaping recesses formed therein, and means for adjusting said die wheels with relation to each other to insure the registry of said die recesses in their several peripheries at their point of approach.

8. A machine for making bead chains, comprising two groups of rotary die units, means associated with each group for forming a metal ribbon into tube form, the units of one group serving to successively operate on one tube to form the same into a series of connected dumb-bells, while the units of the other group are shaped to form the second tube into a series of connected balls, said second tube being formed around the connected dumb-bells produced by the first die group.

9. The method of making bead chains which consists in feeding a tube continuously to rotary forming dies to shape the tube into a series of connected dumb-bells forming a chain core, progressively encasing said core within a tube and continuously advancing said tube and core together to rotary forming dies to shape the encasing tube into a series of connected balls surrounding the heads of adjacent dumb-bells, and thereafter breaking apart connected dumb-bells and connected balls to form a freely flexing chain of independent balls interconnected by independent dumb-bell links.

10. The method of forming bead chain which consists in feeding a metal ribbon continuously to a die which serves to form the same into a tube, feeding the tube continuously as formed to rotary dies which form the tube into a series of connected dumb-bells, feeding a second metal ribbon to a second die through which the formed dumb-bells are continuously led and around which a second tube is progressively formed by said die, passing the said second tube with the dumb-bell core therein to rotary dies which shape said outer tube into a series of connected balls encasing the heads of adjacent dumb-bells and thereafter breaking apart connected dumb-bells and connected balls to form a freely flexing chain of independent balls interconnected by independent links.

11. A machine for making bead chains, comprising successive groups of forming dies for forming a tubular blank into a series of connected chain elements, and means for preventing slack in the partially formed blank between successive die groups.

In testimony whereof we have signed our names to this specification.

GILBERT W. GOODRIDGE.
WILLIAM J. GAGNON.
BERNARD E. GAGNON.